United States Patent
Zhang et al.

(10) Patent No.: US 11,746,039 B2
(45) Date of Patent: Sep. 5, 2023

(54) GLASS COMPOSITION, LOW INCLUSION CONTENT GLASS, PREPARATION METHOD THEREFOR AND APPLICATION THEREOF

(71) Applicant: TUNGHSU GROUP CO., LTD., Shijiazhuang (CN)

(72) Inventors: Guangtao Zhang, Shijiazhuang (CN); Qing Li, Shijiazhuang (CN); Quan Zheng, Shijiazhuang (CN); Lihong Wang, Shijiazhuang (CN); Dongcheng Yan, Shijiazhuang (CN); Junfeng Wang, Shijiazhuang (CN); Bo Wang, Shijiazhuang (CN); Zhiyong Li, Shijiazhuang (CN)

(73) Assignee: TUNGHSU GROUP CO., LTD., Shijiazhuang (CN)

( * ) Notice: Subject to any disclaimer, the term of this patent is extended or adjusted under 35 U.S.C. 154(b) by 359 days.

(21) Appl. No.: 16/969,319

(22) PCT Filed: Nov. 27, 2018

(86) PCT No.: PCT/CN2018/117645
§ 371 (c)(1),
(2) Date: Aug. 12, 2020

(87) PCT Pub. No.: WO2019/153845
PCT Pub. Date: Aug. 15, 2019

(65) Prior Publication Data
US 2021/0047230 A1 Feb. 18, 2021

(30) Foreign Application Priority Data
Feb. 12, 2018 (CN) .................. 201810144654.X

(51) Int. Cl.
| | | |
|---|---|---|
| C03C 3/097 | (2006.01) | |
| C03B 5/225 | (2006.01) | |
| C03B 19/02 | (2006.01) | |
| C03B 23/02 | (2006.01) | |
| C03B 25/00 | (2006.01) | |
| C03C 3/095 | (2006.01) | |
| C03C 19/00 | (2006.01) | |

(52) U.S. Cl.
CPC .............. *C03C 3/097* (2013.01); *C03B 5/225* (2013.01); *C03B 19/02* (2013.01); *C03B 23/02* (2013.01); *C03B 25/00* (2013.01); *C03C 3/095* (2013.01); *C03C 19/00* (2013.01)

(58) Field of Classification Search
CPC ......... C03C 3/097; C03C 3/095; C03C 19/00; C03B 5/225; C03B 19/02; C03B 23/02; C03B 25/00
See application file for complete search history.

(56) References Cited

U.S. PATENT DOCUMENTS

| | | | |
|---|---|---|---|
| 6,417,124 B1 * | 7/2002 | Peuchert ................. | C03C 3/091 313/493 |
| 6,465,381 B1 * | 10/2002 | Lautenschlager ....... | C03C 3/091 501/59 |
| 6,881,692 B2 * | 4/2005 | Murata ................... | C03C 3/093 501/67 |
| 2001/0034293 A1 | 10/2001 | Peuchert et al. | |
| 2002/0151426 A1* | 10/2002 | Murata ................... | C03C 3/093 501/63 |
| 2009/0036290 A1 | 2/2009 | Cornelius et al. | |

FOREIGN PATENT DOCUMENTS

| | | |
|---|---|---|
| CN | 1285325 A | 2/2001 |
| CN | 101801872 A | 8/2010 |
| CN | 102417300 A | 4/2012 |
| CN | 102584007 A | 7/2012 |
| CN | 104986954 A | 10/2015 |
| CN | 105236736 A | 1/2016 |
| JP | H11292563 A | 10/1999 |
| JP | 2001048573 A | 2/2001 |
| JP | 2001106546 A | 4/2001 |
| JP | 2002308643 A | 10/2002 |
| JP | 2012106919 A | 6/2012 |
| JP | 2012121738 A | 6/2012 |
| JP | 2014240332 A | 12/2014 |
| KR | 1020010069996 A | 7/2001 |
| WO | 2012121283 A1 | 9/2012 |

* cited by examiner

*Primary Examiner* — Noah S Wiese
(74) *Attorney, Agent, or Firm* — Volpe Koenig

(57) ABSTRACT

The present disclosure relates to glass manufacturing, a glass composition, glass with a low inclusion content and a preparation method therefor and use thereof. The composition comprises 50-64 wt. % $SiO_2$, 14-24 wt. % $Al_2O_3$, 0-7 wt. % $B_2O_3+P_2O_5$, 0.5-7 wt. % MgO, 1-10 wt. % CaO, 0-9 wt. % SrO, 0.1-14 wt. % BaO, 0.1-5 wt. % ZnO, 0.1-4 wt. % $TiO_2$, 0.1-7 wt. % $Y_2O_3+La_2O_3+Nd_2O_3$, and <0.05 wt. % $R_2O$, wherein $R_2O$ is a sum of the content of $Li_2O$, $Na_2O$ and $K_2O$, and the composition satisfies the following conditions: (1) a temperature $T_{100}$ corresponding to a viscosity of 100 P is 1730° C. or higher; (2) a surface tension at 1300° C. is less than 420 mN/m. The glass prepared by the glass composition and the glass with a low inclusion content preparation method has the advantages of having low inclusion content, having a simple preparation process, being low in cost and so on.

12 Claims, No Drawings

GLASS COMPOSITION, LOW INCLUSION CONTENT GLASS, PREPARATION METHOD THEREFOR AND APPLICATION THEREOF

CROSS REFERENCE TO RELATED APPLICATIONS

This application is a 35 USC § 371 national stage of international application No. PCT/CN2018/117645, which is entitled "GLASS COMPOSITION, LOW INCLUSION CONTENT GLASS, PREPARATION METHOD THEREFOR AND APPLICATION THEREOF, was filed Nov. 27, 2018, and claims priority to Chinese Application No. 201810144654.X, filed on Feb. 12, 2018," both of which are incorporated herein by reference as if fully set forth.

FIELD

The present disclosure relates to the field of glass manufacturing, and in particular to a glass composition, glass with a low inclusion content and a preparation method therefor and use thereof.

BACKGROUND

In the field of flat display, both handheld display devices and fixed display devices are developing towards high definition. Handheld display devices, such as mobile phones, have mainstream pixel densities exceeding 200 ppi, 300 ppi or even 400 ppi; fixed display devices, such as LCD TVs, have a resolution exceeding 2K, 4K or even 8K. The trend of high definition puts forward higher and higher requirements for the fineness of a panel manufacturing process, and then puts forward the need to upgrade the thermal stability and quality of the supporting substrate glass. The glass suitable for a display substrate belongs to an alkali-free high-alumina-silicate glass system, which has the characteristics of a high strain point, high viscosity at a high temperature and high surface tension. The manufacturing difficulty is obviously higher than that of ordinary soda-lime glass. The residual gaseous inclusions are difficult to remove at a high temperature, and finally solidify on the surface or inside of the glass, thus forming bad defects and causing product waste.

At present, several methods have been used to help remove residual gaseous inclusions in the high viscosity glass. One method is to reduce the viscosity of the high temperature glass melt. The melt with a lower viscosity has a higher temperature, it is beneficial to reduce the chemical solubility of common gaseous substances (such as $SO_3$, $CO_2$, $O_2$) in most glass, and at the same time, it is beneficial to reduce the viscous resistance when residual gaseous inclusions rise in the melt, sequentially, rise combined with overflow is facilitated, and a glass isotropic body with the content of residual gaseous inclusions meeting the requirements is obtained. However, display substrate glass has the characteristics of high temperature viscosity and high surface tension. The existing glass melt viscosity used to remove the residual gaseous inclusions in the glass melt is generally about 100 P, and the corresponding temperature at this viscosity often reaches 1650° C., 1700° C. or even 1750° C. or higher. Reducing the viscosity of the high temperature glass melt again will lead to a further increase in temperature, which will further lead to intensification of a reaction between the glass and refractory materials, and then bring great challenges to the temperature resistance and service life of the supporting refractory materials. On the other hand, the melting vessel of the above-mentioned glass melt is often composed of high zirconium bricks containing more than 80% of $ZrO_2$, and the refractory materials (for example, zirconia) eroded and peeled at a high temperature become a potential risk source of solid inclusions in glass.

Another method is to increase the content of the chemical clarifying agent. This method has some problems, such as an increase of residual solid inclusions or a bad effect of eliminating the residual gaseous inclusions. Chemical clarifying agents, such as at least one of $As_2O_3$, $Sb_2O_3$, $SnO_2$, $BaSO_4$, $Ba(NO_3)_2$, etc., are often used when melting the above-mentioned high-viscosity glass melt at a high temperature. With respect to an oxidation atmosphere, from the perspective of green manufacturing, $SnO_2$ is usually used as a clarifying agent at present, and its addition amount is about 0.1-1 wt. %. In one case, with the increase of the addition amount, it is beneficial to eliminate the residual gaseous inclusions in the glass melt, but the risk of $SnO_2$ being condensed and falling into the glass melt flow during the cooling process, which leads to the increase of the content of the residual solid inclusions; in another case, increasing the $SnO_2$ content will make the $O_2$ in the melt supersaturated after chemical dissolution, and too many gaseous substances will not be discharged out of the melt quickly, thus remaining in the form of residual gaseous inclusions and becoming defects. For a reducing atmosphere, sulfate is usually used as a chemical clarifying agent, and its addition amount is about 0.1-1 wt. %. $SO_3$ is a low-temperature clarifying agent, and the increase of the $SO_3$ content can easily lead to early boiling, which makes it impossible to adjust the partial pressure of components in the residual gaseous inclusions in the later stage of homogenization, thus failing to effectively eliminate the gaseous inclusions.

SUMMARY

The objective of the disclosure is to solve the problem of difficult inclusion removal in the prior art, and to provide a glass composition, wherein the glass prepared by the glass composition has the advantages such as a low inclusion content, a simple preparation process, and a low preparation cost.

In order to achieve the above objective, one aspect of the present disclosure provides a glass composition, comprising 50-64 wt. % $SiO_2$, 14-24 wt. % $Al_2O_3$, 0-7 wt. % $B_2O_3$+$P_2O_5$, 0.5-7 wt. % MgO, 1-10 wt. % CaO, 0-9 wt. % SrO, 0.1-14 wt. % BaO, 0.1-5 wt. % ZnO, 0.1-4 wt. % $TiO_2$, 0.1-7 wt. % $Y_2O_3$+$La_2O_3$+$Nd_2O_3$, and <0.05 wt. % $R_2O$, wherein $R_2O$ is a sum of the content of $Li_2O$, $Na_2O$ and $K_2O$, and the composition satisfies the following conditions: (1) a temperature $T_{100}$ corresponding to a viscosity of 100 P is 1730° C. or higher (2) a surface tension at 1300° C. is less than 420 mN/m.

Preferably, the composition also satisfies: (3) a liquidus temperature $T_L$ is lower than 1180° C.

Preferably, the composition also satisfies: (4) a strain point $T_{st}$ is 710° C. or higher.

Preferably, the composition comprises 56-63 wt. % $SiO_2$, 17-22 wt. % $Al_2O_3$, 0-5.2 wt. % $B_2O_3$+$P_2O_5$, 1-5 wt. % MgO, 2-8 wt. % CaO, 0-8 wt. % SrO, 1-12 wt. % BaO, 0.3-4 wt. % ZnO, 0.2-3 wt. % $TiO_2$, 0.1-4 wt. % $Y_2O_3$+$La_2O_3$+$Nd_2O_3$ and <0.05 wt. % $R_2O$, wherein $R_2O$ is a sum of the content of $Li_2O$, $Na_2O$ and $K_2O$.

Preferably, the composition comprises 0-5 wt. % $B_2O_3$, and 0-7 wt. %, preferably 0-5 wt. % $P_2O_5$.

Preferably, the composition comprises 0-2 wt. % $Y_2O_3$, 0-3 wt. % $La_2O_3$, and 0-3 wt. % $Nd_2O_3$.

Preferably, the composition comprises 0.01 wt. % or less of $Li_2O$, 0.01 wt. % or less of $Na_2O$ and 0.01 wt. % or less of $K_2O$.

Preferably, the composition also comprises a chemical clarifying agent. More preferably, the chemical clarifying agent is preferably tin oxide. More preferably, based on a total weight of the composition, the content of the clarifying agent is not more than 1 wt. %.

Preferably, the obtained glass by mixing raw materials and $NH_4NO_3$ evenly with the ratio of the above glass composition, performing melting processing, removing gaseous inclusions in a viscosity range of 210-500 P, and then successively performing molding treatment and annealing treatment, satisfies: the content of gaseous inclusions with an equivalent spherical diameter (D.EQ.) greater than 0.02 mm is less than 0.5/Kg glass.

The second aspect of the present disclosure provides a glass with a low inclusion content, which is prepared by using the above glass composition of the present disclosure.

Preferably, the glass with a low inclusion content is prepared by: mixing raw materials and $NH_4NO_3$ evenly with the ratio of the above glass composition, performing melting processing, removing gaseous inclusions in a viscosity range of 210-500 P, and then successively performing molding treatment and annealing treatment.

The third aspect of the present disclosure provides a method for preparing glass with a low inclusion content, including: mixing raw materials and $NH_4NO_3$ evenly with the ratio of the above glass composition, performing melting processing, and removing gaseous inclusions in a viscosity range of 210-500 P.

Preferably, the amount of $NH_4NO_3$ is 0.2-10 wt. %, preferably 1-8 wt. %, and more preferably 2.5-5 wt. % with respect to the raw materials of the glass composition.

Preferably, the gaseous inclusions are removed in a viscosity range of 220-350 P; more preferably, the gaseous inclusions are removed in a viscosity range of 250-300 P.

Preferably, the method further includes: successively performing molding treatment, annealing treatment and machining treatment on a product obtained by removing gaseous inclusions.

Preferably, the method further includes: performing secondary melting and thinning treatment on the product obtained by the machining treatment.

Preferably, the prepared glass has a thickness of less than 0.1 mm through the machining treatment or the secondary melting and thinning treatment.

The fourth aspect of the present disclosure provides a glass with a low inclusion content prepared by the above preparation method.

Preferably, the glass with a low inclusion content satisfies the following conditions:

(1) the content of gaseous inclusions with an equivalent spherical diameter (D.EQ) greater than 0.02 mm is less than 0.5/Kg glass, and the content of $N_2$ in the gaseous inclusions is ≥50 vol. % by volume;

(2) a difference $\Delta_{ZrO2}$ between the content of $ZrO_2$ and the content of $ZrO_2$ in a mixture before high temperature melting is ≤0.02 wt. %;

(3) the content of solid inclusions larger than 0.02 mm is less than 0.5/kg glass.

More preferably, the glass with a low inclusion content satisfies the following conditions:

(1) the content of gaseous inclusions with an equivalent spherical diameter (D.EQ) greater than 0.02 mm is less than 0.1/Kg glass, and the content of $N_2$ in the gaseous inclusions is ≥60 vol. % by volume;

(2) a difference $\Delta_{ZrO2}$ between the content of $ZrO_2$ and the content of $ZrO_2$ in a mixture before high temperature melting is 0.015 wt. %;

(3) the content of solid inclusions larger than 0.02 mm is less than 0.1/kg glass.

Preferably, the glass with a low inclusion content satisfies the following conditions: the density is lower than 2.7 g/cm$^3$, the thermal expansion coefficient in a range of 50-350° C. is lower than $40 \times 10^{-7}$/° C., the Young's modulus is higher than 80 GPa, the transmittance at a wavelength of 308 nm is higher than 50%, and the thermal shrinkage at a condition of 600° C./10 min is lower than 15 ppm.

The fifth aspect of the disclosure provides use of the glass with a low inclusion content in display device, solar cell substrate glass, safety glass, bulletproof glass, intelligent automobile glass, intelligent traffic display screen, intelligent shop window or smart card ticket.

The inventor of the present disclosure has made an in-depth study on the glass with a low inclusion content, and found that by properly controlling the components and properties of the glass composition, the operating temperature for removing inclusions in the preparation process of a high viscosity glass can be lowered, and the inclusions can be removed more easily, thereby greatly reducing the content of gaseous inclusions and/or solid inclusions in the prepared glass and reasonably reducing the glass manufacturing cost.

According to the method for preparing glass with a low inclusion content of the disclosure, in the silicate reaction stage, the strong oxidant $NH_4NO_3$ promotes the valence-changing chemical clarifying agent to keep in a high-valence state, so as to avoid failure caused by premature reaction before the intense oxygen release stage; at the stage of glass structure formation and removal of gaseous inclusions, $N_2$ obtained by $NH_4NO_3$ decomposition is dissolved and supersaturated in the glass and then enters the gaseous inclusions, and with the increase of $N_2$ gas partial pressure, $O_2$, $CO_2$ and other gases are promoted to enter the gaseous inclusions continuously, thus increasing the volume of the gaseous inclusions, reducing the $N_2$ gas partial pressure and promoting $N_2$ to enter the gaseous inclusions again. Through circulation, the volume and buoyancy of the gaseous inclusions are constantly increased, and finally they are discharged out of the glass body. By adopting the method for preparing glass with a low inclusion content of the disclosure, the content of the gaseous inclusions and/or solid inclusions in the glass can be further reduced by adding $NH_4NO_3$ and removing gaseous inclusions within a specific viscosity range.

DETAILED DESCRIPTION OF THE EMBODIMENTS

The endpoints and any values of the ranges disclosed herein are not limited to such precise ranges or values, which should be understood to contain values close to those ranges or values. For numerical ranges, one or more new numerical ranges can be obtained by combining the endpoint values of each range, between the endpoint values of each range and individual point values, and between individual point values. These numerical ranges should be considered as specifically disclosed herein.

The present disclosure provides a glass composition, comprising 50-64 wt. % $SiO_2$, 14-24 wt. % $Al_2O_3$, 0-7 wt. % $B_2O_3+P_2O_5$, 0.5-7 wt. % MgO, 1-10 wt. % CaO, 0-9 wt. % SrO, 0.1-14 wt. % BaO, 0.1-5 wt. % ZnO, 0.1-4 wt. % $TiO_2$, 0.1-7 wt. % $Y_2O_3+La_2O_3+Nd_2O_3$, and <0.05 wt. %

$R_2O$, wherein $R_2O$ is a sum of the content of $Li_2O$, $Na_2O$ and $K_2O$, and the composition satisfies the following conditions: (1) a temperature $T_{100}$ corresponding to a viscosity of 100 P is 1730° C. or higher (2) a surface tension at 1300° C. is less than 420 mN/m.

Preferably, the composition also satisfies: (2) a surface tension at 1300° C. is less than 400 mN/m.

According to a preferred embodiment of the present disclosure, the composition also satisfies: (3) a liquidus temperature $T_L$ is lower than 1180° C.

According to a preferred embodiment of the present disclosure, the composition also satisfies: the strain point $T_{st}$ is 710° C. or higher.

In the present disclosure, a high temperature viscosity-temperature curve of glass is measured according to ASTM C-965, wherein $T_{100}$ is the temperature corresponding to the viscosity of 100 P and the unit is ° C.; the surface tension at 1300° C. is measured by a high temperature surface tensiometer (Beijing Xuhui Xinrui Technology Co., Ltd., ZLXS-II); the liquidus temperature $T_L$ is measured by the furnace gradient method according to ASTM C-829; the strain point $T_{st}$ is determined according to ASTM C-336.

In the present disclosure, by making the glass composition have the above composition and properties, the glass composition can be used to remove the residual gaseous inclusions in the glass melt at a higher viscosity (for example, 210-500 P), so that the process of removing gaseous inclusions in the glass composition melt of the present disclosure can be carried out at a lower operating temperature. That is to say, the minimum viscosity $\eta_{min}$ of the glass composition melt for removing gaseous inclusions is 210-500 P, preferably 220-350 P, and more preferably 250-300 P. By controlling and increasing the minimum melt viscosity, the glass composition melt of the present disclosure has the effect of "boiling" at an appropriate stage, which not only greatly reduces the content of residual gaseous inclusions and promotes the process of melt homogenization, but also widens the process belt and reduces the production difficulty. At the same time, by controlling the surface tension of the glass, gas inclusions can be eliminated more easily, and the inclusion content in the prepared glass can be further reduced.

According to a preferred embodiment of the present disclosure, the composition comprises 56-63 wt. % $SiO_2$, 17-22 wt. % $Al_2O_3$, 0-5.2 wt. % $B_2O_3+P_2O_5$, 1-5 wt. % MgO, 2-8 wt. % CaO, 0-8 wt. % SrO, 1-12 wt. % BaO, 0.3-4 wt. % ZnO, 0.2-3 wt. % $TiO_2$, 0.1-4 wt. % $Y_2O_3+La_2O_3+Nd_2O_3$ and <0.05 wt. % $R_2O$, wherein $R_2O$ is a sum of the content of $Li_2O$, $Na_2O$ and $K_2O$.

Preferably, the composition comprises 0-5 wt. % $B_2O_3$, and 0-7 wt. %, preferably 0-5 wt. % $P_2O_5$. For example, $B_2O_3$ is 0-4.7 wt. % and/or $P_2O_5$ is 0-1.5 wt. %.

Preferably, the composition comprises 0-2 wt. % $Y_2O_3$, 0-3 wt. % $La_2O_3$, and 0-3 wt. % $Nd_2O_3$. For example, $Y_2O_3$ is 0-1 wt. %, $La_2O_3$ is 0-1.7 wt. % and/or $Nd_2O_3$ is 0-2 wt. %.

Preferably, the composition comprises 0.01 wt. % or less of $Li_2O$, 0.01 wt. % or less of $Na_2O$ and 0.01 wt. % or less of $K_2O$.

According to the disclosure, the glass composition of the disclosure can also comprise a chemical clarifying agent as required. As the chemical clarifying agent, there is no special limitation, and can be one or more existing chemical clarifying agents that can be used for glass, such as tin oxide, arsenic oxide, antimony oxide, barium sulfate and barium nitrate. Preferably, the chemical clarifying agent is preferably tin oxide. As the content of the chemical clarifying agent, when the total weight of the composition is 100 wt. %, the content of the clarifying agent is preferably no more than 1 wt. %, preferably 0.1-0.8 wt. %, and more preferably 0.2-0.4 wt. %.

According to the present disclosure, in order to reduce the inclusion content of the glass composition, preferably, the obtained glass by mixing raw materials and $NH_4NO_3$ evenly with the ratio of the above glass composition, performing melting processing, removing gaseous inclusions in a viscosity range of 210-500 P, and then successively performing molding treatment and annealing treatment, satisfies: the content of gaseous inclusions with an equivalent spherical diameter (D.EQ.) greater than 0.02 mm is less than 0.5/Kg glass.

According to a further preferred embodiment of the present disclosure, the obtained glass by mixing raw materials and $NH_4NO_3$ evenly with the ratio of the above glass composition, performing melting processing, removing gaseous inclusions in a viscosity range of 210-500 P, and then successively performing molding treatment and annealing treatment, satisfies: the content of $N_2$ in the gaseous inclusions is ≥50 vol. % by volume.

The disclosure also provides glass with a low inclusion content, which is prepared by the glass composition of the disclosure.

The glass with a low inclusion content can be prepared by any existing method for glass preparation. In order to reduce the content of inclusions and improve the physical properties of glass, preferably, the glass with a low inclusion content is prepared by: mixing raw materials and $NH_4NO_3$ evenly with the ratio of the above glass composition, performing melting processing, removing gaseous inclusions in a viscosity range of 210-500 P, and then successively performing molding treatment and annealing treatment. By mixing the raw materials according to the composition ratio of the present disclosure with $NH_4NO_3$ and removing gaseous inclusions within a specific viscosity range, the content of gaseous inclusions and/or solid inclusions in the prepared glass is greatly reduced, and the glass manufacturing cost can be reasonably reduced.

The disclosure also provides a preparation method of glass with a low inclusion content, wherein the method includes: mixing raw materials and $NH_4NO_3$ evenly with the ratio of the above glass composition, performing melting processing, and removing gaseous inclusions in a viscosity range of 210-500 P.

It should be understood by those skilled in the art that the glass composition of the present disclosure comprises $SiO_2$, $Al_2O_3$, MgO, CaO, SrO, BaO, ZnO, $TiO_2$, $Y_2O_3$, $La_2O_3$ and $Nd_2O_3$. The raw materials for preparing the glass composition refer to the use of carbonates, nitrates, sulfates, phosphates, basic carbonates, oxides and the like containing the above elements, and the content of each component is calculated according to the oxide of each element. The specific selection of carbonate, nitrate, sulfate, phosphate, basic carbonate and oxide of each element is well known to those skilled in the art, and will not be repeated here.

In the disclosure, the raw materials according to the glass composition ratio of the present disclosure are mixed with $NH_4NO_3$ before high-temperature melting, and the gaseous inclusions are removed within a specific viscosity range, which not only greatly reduces the content of gaseous inclusions and/or solid inclusions in the prepared glass, but also reasonably reduces the glass manufacturing cost.

According to the disclosure, the amount of $NH_4NO_3$ is not specially limited, as long as the effect of removing gaseous inclusions can be achieved. According to a preferred embodiment of the disclosure, the amount of $NH_4NO_3$ is 0.2-10 wt. %, preferably 1-8 wt. %, and more preferably 2.5-5 wt. % relative to the raw materials according to the glass composition ratio. By making the amount of $NH_4NO_3$ within the above range, the decomposition of $NH_4NO_3$ can ensure enough $N_2$ to participate in the process of removing gaseous inclusions from the glass melt, so as to further improve the effect of removing gaseous inclusions.

In the method of the present disclosure, the gaseous inclusions are preferably removed in the viscosity range of 220-350 P; more preferably, the gaseous inclusions are removed in the viscosity range of 250-300 P. By controlling the removal of the gaseous inclusions within the above viscosity range (more preferably removing gaseous inclusions at the above minimum melt viscosity), compared with the conventional removal of the gaseous inclusions at the viscosity of 100 P or less, the present disclosure can perform the operation of removing gaseous inclusions at a lower temperature, thereby reducing the manufacturing energy consumption and cost.

In the method of the present disclosure, the conditions for melting treatment are not particularly limited, and existing conditions that can be used for melting treatment of glass compositions can be adopted. Preferably, the conditions of the melting treatment include that the temperature is lower than 1680° C. and the time is longer than 1 h, for example, the temperature is 1600-1650° C. and the time is 2-50 h. Those skilled in the art can determine the specific melting temperature and melting time according to the actual situation, which is well known to those skilled in the art and will not be repeated here.

According to the present disclosure, the method also includes successively performing molding treatment, annealing treatment and machining treatment of a product obtained by removing gaseous inclusions.

In the preparation method of the present disclosure, the molding treatment is not particularly limited, and can be various common molding treatment methods in the field, such as an overflow method, a floating method, a pressing method, a blowing method, a drawing method, an extended pressing method, a casting method, etc.

In the preparation method of the present disclosure, preferably, the annealing conditions include that the temperature is higher than 730° C. and the time is longer than 0.1 h, for example, the temperature is 770-850° C. and the time is 0.5-5 h. Those skilled in the art can determine the specific annealing temperature and annealing time according to the actual situation, which is well known to those skilled in the art and will not be described in detail here.

In the preparation method of the present disclosure, the machining treatment is not particularly limited, and can be various common machining methods in the field, such as cutting, grinding, polishing, etc., of the product obtained by annealing treatment.

According to a preferred embodiment of the present disclosure, the method further includes: secondary melting and thinning treatment is performed on the product obtained by the machining treatment. The thickness of the obtained glass can be further reduced by the secondary melting and thinning treatment.

According to the present disclosure, preferably, the prepared glass has a thickness of less than 0.1 mm, and preferably 0.01-0.08 mm, through the machining treatment or the secondary melting and thinning treatment.

The present disclosure further provides glass with a low inclusion content prepared by the above preparation method.

Preferably, the glass with a low inclusion content satisfies the following conditions:
(1) the content of gaseous inclusions with an equivalent spherical diameter (D.EQ) greater than 0.02 mm is less than 0.5/Kg glass, and the content of $N_2$ in the gaseous inclusions is ≥50 vol. % by volume;
(2) a difference $\Delta_{ZrO2}$ between the content of $ZrO_2$ and the content of $ZrO_2$ in a mixture before high temperature melting is ≤0.02 wt. %;
(3) the content of solid inclusions larger than 0.02 mm is less than 0.5/kg glass.

More preferably, the glass with a low inclusion content satisfies the following conditions:
(1) the content of gaseous inclusions with an equivalent spherical diameter (D.EQ) greater than 0.02 mm is less than 0.1/Kg glass, and the content of $N_2$ in the gaseous inclusions is ≥60 vol. % by volume;
(2) a difference $\Delta_{ZrO2}$ between the content of $ZrO_2$ and the content of $ZrO_2$ in a mixture before high temperature melting is 0.015 wt. %;
(3) the content of solid inclusions larger than 0.02 mm is less than 0.1/kg glass.

According to a preferred embodiment of the present disclosure, the glass with a low inclusion content satisfies the following conditions: the density is lower than 2.7 g/cm$^3$, the thermal expansion coefficient in a range of 50-350° C. is lower than $40 \times 10^{-7}$/° C., the Young's modulus is higher than 80 GPa, the transmittance is 50% or higher at a wavelength of 308 nm, and the thermal shrinkage is lower than 15 ppm at 600° C./10 min.; preferably, the density is lower than 2.7 g/cm$^3$, the thermal expansion coefficient in a range of 50-350° C. is lower than $40 \times 10^{-7}$/° C., the Young's modulus is higher than 80 GPa, the transmittance is 50% or higher at a wavelength of 308 nm, and the thermal shrinkage is lower than 10 ppm at 600° C./10 min.

The disclosure also provides the use of the glass with a low inclusion content in display device, solar cell substrate glass, safety glass, bulletproof glass, intelligent automobile glass, intelligent traffic display screen and intelligent window. The glass with a low inclusion content of the present disclosure is particularly suitable in application fields for preparing glass substrate materials and/or screen surface protection glass film materials of flat panel display products, glass substrate materials and/or surface packaging glass materials and/or screen surface protection glass film materials of flexible display products, glass substrate materials of flexible solar cell, safety glass, bulletproof glass, intelligent car glass, intelligent traffic display screen, smart window, smart card ticket and other applications requiring high thermal and mechanical stability glass materials.

Hereinafter, the present disclosure will be described in detail through examples. In the following examples, unless otherwise specified, all the materials used can be obtained from commercial sources, and unless otherwise specified, the methods used are conventional methods in the field.

The density of the glass is measured with reference to ASTM C-693, and the unit is g/cm$^3$.

The thermal expansion coefficient of the glass is measured at 50-350° C. with a horizontal dilatometer according to ASTM E-228, and the unit is $10^{-7}$/° C.

The Young's modulus of the glass is determined according to ASTM C-623, and the unit is GPa.

The high temperature viscosity-temperature curve of the glass is measured with reference to ASTM C-965, wherein $T_{100}$ is the temperature corresponding to a viscosity of 100 P and the unit is ° C.; Tx is the temperature corresponding to a viscosity of X P and the unit is ° C.

The liquidus temperature $T_L$ of the glass is measured by the furnace gradient method according to ASTM C-829, and the unit is ° C.

The strain point $T_{st}$ of the glass is measured with reference to ASTM C-336, and the unit is ° C.

The surface tension of the glass at 1300° C., is measured by a high temperature surface tensiometer (Beijing Xuhui Xinrui Technology Co., Ltd., ZLXS-II), and the unit is mN/m.

A gas bubble analysis mass spectrometer (IPI company, Germany, GIA522) is used to determine the types of various constituents and volume percentages in the residual gaseous inclusions in the glass, and the unit is vol. %.

The number of the gaseous inclusions in the glass is counted by using a ×200 times polarizing microscope (Olympus Corp., BX51, the same below), and the unit is /kg glass.

The number of the solid inclusions in the glass is counted by using a ×200 times polarizing microscope, and the unit is /kg glass.

An X-ray fluorescence spectrometer (PANalytical Company, Netherlands, Magix(PW2403)) is used to measure the $ZrO_2$ content in the mixture, which is recorded as $m_1$, and the unit is wt. %; an X-ray fluorescence spectrometer is used to measure the $ZrO_2$ content in the prepared glass, which is recorded as $m_2$, and the unit is wt. %; the difference between the $ZrO_2$ content $m_2$ in the prepared glass and the $ZrO_2$ content $m_1$ in the mixture before high temperature melting is recorded as $\Delta_{ZrO2}$, that is, $\Delta_{ZrO2}=m_2-m_1$, and the unit is wt. %.

The transmittance of the glass is measured by an ultraviolet-visible spectrophotometer (Perkin Elmer Company, LAMBDA25). The thickness of a glass sample is 0.5 mm, and the transmittance at 308 nm is taken with a unit of %.

The following heat treatment method (a difference calculation method) was adopted to measure the heat shrinkage rate after heat treatment: the glass was heated from 25° C. (an initial length was measured, and marked as L0) to 600° C. at a heating rate of 5° C./min, and then kept at 600° C. for 10 min, and then cooled to 25° C. at a cooling rate of 5° C./min, so that the length of the glass shrank to a certain extent, and the length was measured again, and marked as Lt, then the thermal shrinkage $Y_t$ was expressed as $$Yt = \frac{L0 - Lt}{L0} * 100\%,$$

and the final unit was expressed in ppm.

EXAMPLES 1-13 AND COMPARATIVE EXAMPLES 1-3

According to the proportions shown in Tables 1-2, the raw material components were weighted, and mixed evenly, the mixture was poured into a high zirconium brick crucible ($ZrO_2$>85 wt. %), then it was heated for 48 h in a resistance furnace with a temperature of $T_x$ corresponding to a viscosity of $\eta_x$ P, and was slowly stirred at a constant speed with a high zirconium bar ($ZrO_2$>85 wt. %) stirrer. The molten glass was quickly poured into a stainless steel cast iron grinding tool to form a specified block glass product, then the glass product was annealed in an annealing furnace for 2 hours, and then the power was turned off and the product was cooled to 25° C. along with the furnace. The glass product was cut, ground and polished, then cleaned with deionized water and dried to obtain a glass product with a thickness of 0.5 mm. The properties of each glass product are measured respectively, and the results are shown in Tables 1-2, and the composition of the gaseous inclusions in the glass is shown in Table 3.

TABLE 1

| Mass percent (wt %) | | Example 1 | Example 2 | Example 3 | Example 4 | Example 5 |
|---|---|---|---|---|---|---|
| $SiO_2$ | | 61.7 | 62.8 | 57 | 57.5 | 59.8 |
| $Al_2O_3$ | | 20 | 18.2 | 19 | 18.5 | 18 |
| $B_2O_3$ | | 2 | 0.5 | 1.5 | 1 | |
| $P_2O_5$ | | 1 | | 1.5 | | 0.5 |
| MgO | | 4.6 | 1.9 | 3 | 1.5 | 2.5 |
| CaO | | 3.3 | 5 | 4 | 3 | 6.7 |
| SrO | | 0.8 | 2 | 1 | 8 | |
| BaO | | 3.7 | 7 | 10.5 | 1 | 6.2 |
| ZnO | | 0.5 | 1.2 | 1 | 2.3 | 4 |
| $TiO_2$ | | 1 | 0.6 | 0.5 | 3 | 0.4 |
| $Y_2O_3$ | | 0.6 | | 0.1 | 1 | |
| $La_2O_3$ | | 0.2 | 0.4 | 0.5 | 1 | 1.7 |
| $Nd_2O_3$ | | 0.3 | | | 2 | |
| $SnO_2$ | | 0.3 | 0.4 | 0.4 | 0.2 | 0.2 |
| percentage of $NH_4NO_3$ added in the mixture | wt % | 3.2 | 4.9 | 2.8 | 2.5 | 5 |
| Content of $ZrO_2$ in the mixture | wt % | 0.00654 | 0.00668 | 0.00751 | 0.00727 | 0.00839 |
| Content of $ZrO_2$ in the prepared glass | wt % | 0.01895 | 0.02011 | 0.01773 | 0.02085 | 0.02273 |
| $\Delta ZrO_2$ | wt % | 0.012 | 0.013 | 0.010 | 0.014 | 0.014 |
| melt viscosity for excluding gaseous inclusions $\eta_x$ | P | 240 | 250 | 300 | 220 | 280 |
| temperature for excluding gaseous inclusions $T_x$ | ° C. | 1635 | 1674 | 1630 | 1659 | 1607 |

TABLE 1-continued

| | | | | | | |
|---|---|---|---|---|---|---|
| Content of gaseous inclusions with (D.EQ.) greater than 0.02 mm | number/Kg glass | 0.01 | 0 | 0.01 | 0.01 | 0.01 |
| content of solid inclusions greater than 0.02 mm | number/Kg glass | 0 | 0 | 0 | 0 | 0 |
| $T_{100}$ | °C. | 1735 | 1781 | 1756 | 1742 | 1733 |
| $T_{st}$ | °C. | 748 | 749 | 735 | 753 | 739 |
| $T_1$ | °C. | 1160 | 1155 | 1140 | 1150 | 1150 |
| surface tension at 1300° C. | mN/m | 362.3 | 347.1 | 368.8 | 339.2 | 356.6 |
| density | g/cm³ | 2.51 | 2.58 | 2.59 | 2.67 | 2.65 |
| expansion | ×10⁻⁷/°C. | 31.5 | 35.4 | 34.2 | 35.9 | 38.7 |
| Young's modulus E | GPa | 82.0 | 81.8 | 82.3 | 82.5 | 80.6 |
| transmittance at wavelength of 308 nm | % | 75.8 | 74.7 | 77.2 | 70.4 | 71.9 |
| thermal shrinkage at 600° C./10 min | ppm | 7.4 | 6.8 | 8.3 | 5.2 | 9.2 |

| Mass percent (wt %) | | Example 6 | Example 7 | Example 8 | Example 9 |
|---|---|---|---|---|---|
| $SiO_2$ | | 61 | 63 | 56 | 62.2 |
| $Al_2O_3$ | | 18.6 | 17 | 22 | 17.5 |
| $B_2O_3$ | | | 1 | 4.7 | |
| $P_2O_5$ | | | 0.8 | 0.5 | |
| MgO | | 2.1 | 5 | 1 | 1.2 |
| CaO | | 3.4 | 2 | 8 | 2.2 |
| SrO | | 0.5 | 0.9 | | 1.2 |
| BaO | | 12 | 9.5 | 5.6 | 14 |
| ZnO | | 0.7 | 0.3 | 0.7 | 1 |
| $TiO_2$ | | 0.5 | 0.2 | 0.7 | 0.1 |
| $Y_2O_3$ | | 0.4 | 0.1 | 0.5 | |
| $La_2O_3$ | | 0.5 | | | 0.2 |
| $Nd_2O_3$ | | | | | 0.2 |
| $SnO_2$ | | 0.3 | 0.2 | 0.3 | 0.2 |
| percentage of $NH_4NO_3$ added in the mixture | wt % | 6.3 | 2.5 | 8 | 1 |
| Content of $ZrO_2$ in the mixture | wt % | 0.00744 | 0.00751 | 0.00648 | 0.00841 |
| Content of $ZrO_2$ in the prepared glass | wt % | 0.02155 | 0.02126 | 0.01965 | 0.01972 |
| $\Delta ZrO_2$ | wt % | 0.014 | 0.014 | 0.013 | 0.011 |
| melt viscosity for excluding gaseous inclusions $\eta_x$ | P | 350 | 260 | 230 | 380 |
| temperature for excluding gaseous inclusions $T_x$ | °C. | 1617 | 1669 | 1652 | 1635 |
| Content of gaseous inclusions with (D.EQ.) greater than 0.02 mm | number/Kg glass | 0.02 | 0.01 | 0.02 | 0.02 |
| content of solid inclusions greater than 0.02 mm | number/Kg glass | 0 | 0 | 0 | 0.01 |
| $T_{100}$ | °C. | 1777 | 1779 | 1733 | 1795 |
| $T_{st}$ | °C. | 762 | 735 | 743 | 775 |
| $T_1$ | °C. | 1160 | 1145 | 1140 | 1180 |
| surface tension at 1300° C. | mN/m | 370.1 | 368.8 | 359.4 | 368.9 |
| density | g/cm³ | 2.63 | 2.57 | 2.54 | 2.65 |
| expansion | ×10⁻⁷/°C. | 37.1 | 33.7 | 33.5 | 36.3 |
| Young's modulus E | GPa | 81.8 | 85.8 | 83.3 | 80.9 |
| transmittance at wavelength of 308 nm | % | 75.2 | 74.3 | 77.9 | 74.6 |
| thermal shrinkage at 600° C./10 min | ppm | 5.4 | 8.5 | 7.6 | 4.3 |

TABLE 2

| Mass percent (wt %) | | Example 10 | Example 11 | Example 12 | Example 13 | Comparative Example 1 | Comparative Example 2 | Comparative Example 3 |
|---|---|---|---|---|---|---|---|---|
| $SiO_2$ | | 64 | 52 | 50 | 54 | 55.8 | 62.8 | 62.8 |
| $Al_2O_3$ | | 19.7 | 14 | 15 | 24 | 23.2 | 18.2 | 18.2 |
| $B_2O_3$ | | 0.3 | 5 | | | 4.7 | 0.5 | 0.5 |
| $P_2O_5$ | | | | 7 | | | | |
| MgO | | 6 | 7 | 0.5 | 6.6 | 1.9 | 1.9 | 1.9 |
| CaO | | 1 | 10 | 2.7 | 5.5 | 5 | 5 | 5 |
| SrO | | | 9 | | | 2 | 2 | 2 |
| BaO | | 0.1 | 0.5 | 12.5 | 0.7 | 7 | 7 | 7 |
| ZnO | | 0.1 | 0.3 | 5 | 1.7 | 0 | 1.2 | 1.2 |
| $TiO_2$ | | 3.5 | 0.4 | 4 | 0.3 | 0 | 0.6 | 0.6 |
| $Y_2O_3$ | | 2 | 1 | 1 | 2 | | | |
| $La_2O_3$ | | | 0.5 | 1 | 3 | 0 | 0.4 | 0.4 |
| $Nd_2O_3$ | | 3 | | 1 | 2 | | | |
| $SnO_2$ | | 0.3 | 0.3 | 0.3 | 0.2 | 0.4 | 0.4 | 0.4 |
| percentage of $NH_4NO_3$ added in the mixture | wt % | 0.2 | 10 | 9 | 0.7 | 4.9 | 4.9 | 0 |
| Content of $ZrO_2$ in the mixture | wt % | 0.00712 | 0.00699 | 0.00618 | 0.00657 | 0.00683 | 0.00668 | 0.00668 |
| Content of $ZrO_2$ in prepared glass | wt % | 0.02235 | 0.02496 | 0.02117 | 0.02211 | 0.02547 | 0.0629 | 0.02854 |
| $\Delta ZrO_2$ | wt % | 0.015 | 0.018 | 0.015 | 0.016 | 0.019 | 0.056 | 0.022 |
| melt viscosity for excluding gaseous inclusions $\eta_x$ | P | 210 | 430 | 500 | 400 | 250 | 100 | 250 |
| temperature for excluding gaseous inclusions $T_x$ | °C. | 1667 | 1559 | 1550 | 1611 | 1612 | 1781 | 1674 |
| Content of gaseous inclusions with (D.EQ.) greater than 0.02 mm | number/Kg glass | 0.02 | 0.17 | 0.35 | 0.1 | 0.01 | 214 | 136 |
| content of solid inclusions greater than 0.02 mm | number/Kg glass | 0 | 0.01 | 0 | 0 | 0 | 4 | 1 |
| $T_{100}$ | °C. | 1752 | 1731 | 1737 | 1776 | 1698 | 1781 | 1781 |
| $T_{st}$ | °C. | 757 | 713 | 716 | 728 | 702 | 750 | 749 |
| $T_1$ | °C. | 1180 | 1175 | 1170 | 1175 | 1240 | 1175 | 1175 |
| surface tension at 1300° C. | mN/m | 391.9 | 344.9 | 357.1 | 383.6 | 342.6 | 346.9 | 347.3 |
| density | g/cm³ | 2.50 | 2.64 | 2.69 | 2.61 | 2.54 | 2.58 | 2.6 |
| expansion | ×10⁻⁷/°C. | 36.2 | 35.8 | 36.7 | 37.1 | 34.7 | 35.5 | 35.4 |
| Young's modulus E | GPa | 81.2 | 86.4 | 82.5 | 86.9 | 77.3 | 81.7 | 81.7 |
| transmittance at wavelength of 308 nm | % | 74.4 | 72.2 | 71.9 | 73.6 | 72.2 | 74.5 | 74.7 |
| thermal shrinkage at 600° C./10 min | ppm | 5.5 | 12.4 | 11.6 | 10.8 | 53.6 | 6.8 | 6.9 |

TABLE 3

| Serial No. | Bubble size [mm] a | b | c | Equivalent spherical diameter (D.EQ.) [mm] | Volume [ml] | Intensity of pressure p [KPa] | Gas composition [vol. %] $N_2$ | $CO_2$ | $O_2$ | Ar | $SO_2$ | $H_2S$ | COS | CO | $CH_4$ | $H_2$ |
|---|---|---|---|---|---|---|---|---|---|---|---|---|---|---|---|---|
| Example 1 | 3.75 | 0.13 | 0.03 | 0.24 | 7.65E-06 | 21.0 | 64.2 | 30.2 | | 1.3 | 4.3 | | | | | |
| Example 2 | 0.07 | 0.01 | 0.01 | 0.02 | 3.66E-09 | <<1 | 64.7 | 31 | | 1.5 | 2.8 | | | | | |
| Example 3 | 6.20 | 0.15 | 0.03 | 0.30 | 1.46E-05 | 21.5 | 69 | 22.8 | | 0.7 | 7.5 | | | | | |
| Example 4 | 0.12 | 0.03 | 0.02 | 0.04 | 3.77E-08 | <<1 | 67.3 | 27.3 | | 1 | 4.4 | | | | | |
| Example 5 | 2.28 | 0.10 | 0.03 | 0.19 | 3.58E-06 | 70.4 | 76.1 | 15.3 | 1.4 | 1.1 | 5.8 | | | | | 0.3 |
| Example 6 | 2.97 | 0.12 | 0.03 | 0.22 | 5.60E-06 | 37.58 | 88.2 | 4.6 | | 0.7 | 5.2 | 0.1 | | 0.8 | | 0.4 |
| Example 7 | 0.60 | 0.07 | 0.03 | 0.11 | 6.59E-07 | <<1 | 74.3 | 17.5 | | 2.2 | 6.0 | | | | | |
| Example 8 | 1.80 | 0.12 | 0.03 | 0.19 | 3.39E-06 | 5.0 | 71.3 | 15.8 | 0.4 | 1.4 | 10.3 | | | 0.2 | | 0.6 |
| Example 9 | 0.12 | 0.03 | 0.02 | 0.04 | 3.77E-08 | <<1 | 56.6 | 29.5 | | 0.6 | 13.3 | | | | | |
| Example 10 | 3.65 | 0.17 | 0.04 | 0.29 | 1.30E-05 | 77.1 | 51.2 | 36.9 | | 3.9 | 8.0 | | | | | |
| Example 11 | 2.78 | 0.16 | 0.03 | 0.24 | 6.98E-06 | 64.3 | 55.5 | 10.6 | 24.9 | 1.1 | 7.9 | | | | | |
| Example 12 | 1.85 | 0.15 | 0.05 | 0.24 | 7.26E-06 | 43.2 | 50.8 | 5.0 | 39.5 | 0.6 | 4.1 | | | | | |
| Example 13 | 0.23 | 0.10 | 0.02 | 0.08 | 2.41E-07 | <<1 | 54.4 | 35.1 | | 8.2 | 2.3 | | | | | |
| Comparative example 1 | 10.90 | 0.13 | 0.03 | 0.35 | 2.22E-05 | 29.5 | 76.5 | 12.7 | | 0.7 | 10.1 | | | | | |

TABLE 3-continued

| Serial No. | Bubble size [mm] a | b | c | Equivalent spherical diameter (D.EQ.) [mm] | Volume [ml] | Intensity of pressure p [KPa] | Gas composition [vol. %] | | | | | | | | | |
|---|---|---|---|---|---|---|---|---|---|---|---|---|---|---|---|---|
| | | | | | | | $N_2$ | $CO_2$ | $O_2$ | Ar | $SO_2$ | $H_2S$ | COS | CO | $CH_4$ | $H_2$ |
| Comparative example 2 | 13.30 | 0.17 | 0.03 | 0.41 | 3.55E−05 | 18.0 | 21.3 | 28.8 | 30.1 | 0.2 | 19.6 | | | | | |
| Comparative example 3 | 9.10 | 0.16 | 0.03 | 0.35 | 2.29E−05 | 19.0 | 63.4 | 1.7 | | 34.9 | | | | | | |

In this table: 7.65E-06 in the column of "volume" means $7.65 \times 10^{-6}$, 3.66E-09 means $3.66 \times 10^{-9}$, and so do other data expressions.

Comparing the data of examples in Tables 1-3 with those of comparative examples, it can be seen that the glass with a low inclusion content obtained in examples 1-13 of the present disclosure has greatly reduced the content of gaseous inclusions and/or solid inclusions in the prepared glass by selecting the components and preparation method of the present disclosure, and the inclusion removal process can be carried out at a lower temperature, thus reducing the glass manufacturing cost. Among them, by selecting the preferred raw material components in examples 1-8, the obtained glass has a lower liquidus temperature $T_1$, a proper strain point $T_{st}$ and other physical properties, which are more conducive to the use of glass.

On the contrary, the raw materials used in comparative example 1 are not within the scope of the present disclosure, and the obtained glass has poor physical properties such as strain point and thermal shrinkage, which cannot meet the application requirements; in comparative example 2, the inclusion removal condition of the present disclosure is not adopted, but the higher temperature commonly used in the prior art is adopted to remove the inclusions. In comparative example 3, $NH_4NO_3$ is not added, but the inclusions in the glass obtained in the comparative examples 2 and 3 are higher, which are much higher than those of the glass with a low inclusion content in examples 1-13 of this application.

It can be seen that the method of the present disclosure has obvious effect on the problem that the content of gaseous inclusions and solid inclusions in high viscosity glass such as display substrate glass is too high, and the high viscosity glass prepared by using a higher glass melt viscosity with the gaseous inclusions removed has the advantages of obviously lower content of gaseous inclusions and solid inclusions, higher thermal stability, higher glass forming stability, high mechanical strength and the like.

Preferred embodiments of the present disclosure have been described in detail above, but the present disclosure is not limited thereto. Within the technical conception of the present disclosure, various simple modifications can be made to the technical solution of the present disclosure, including the combination of various technical features in any other suitable way. These simple modifications and combinations should also be regarded as the contents disclosed by the present disclosure and fall into the protection scope of the present disclosure.

The invention claimed is:

1. A method for preparing glass with a low inclusion content, comprising:
   mixing raw materials and $NH_4NO_3$ uniformly with a glass composition comprising 50-64 wt % $SiO_2$, 14-24 wt % $Al_2O_3$, 0-7 wt % $B_2O_3+P_2O_5$, 0.5-7 wt % MgO, 1-10 wt % CaO, 0-9 wt % SrO, 0.1-14 wt % BaO, 0.1-5 wt % ZnO, 0.1-4 wt % $TiO_2$, 0.1-7 wt % $Y_2O_3+La_2O_3+Nd_2O_3$, and <0.05 wt % $R_2O$, wherein $R_2O$ is a sum of the content of $Li_2O$, $Na_2O$ and $K_2O$, the glass composition having (1) a temperature T100 corresponding to a viscosity of 100 P of 1730° C. or higher and (2) a surface tension at 1300° C. less than 420 mN/m,
   performing melting processing,
   removing gaseous inclusions in a viscosity range of 210-500 P,
   successively performing molding treatment and annealing treatment,
   performing machining treatment on an annealed product, and
   performing secondary melting and thinning treatment on the product obtained by the machining treatment.

2. The method for preparing the glass with a low inclusion content according to claim 1, wherein the amount of $NH_4NO_3$ is 0.2-10 wt %, with respect to the raw materials of the glass composition.

3. The method for preparing the glass with a low inclusion content according to claim 2, wherein the amount of $NH_4NO_3$ is 1-8 wt % with respect to the raw materials of the glass composition.

4. The method for preparing the glass with a low inclusion content according to claim 2, wherein the amount of $NH_4NO_3$ is 2.5-5 wt % with respect to the raw materials of the glass composition.

5. The method for preparing the glass with a low inclusion content according to claim 2, wherein the gaseous inclusions are removed in a viscosity range of 220-350 P.

6. The method for preparing the glass with a low inclusion content according to claim 2, wherein the gaseous inclusions are removed in a viscosity range of 250-300 P.

7. The method for preparing the glass with a low inclusion content according to claim 1, wherein the glass composition having (3) a liquidus temperature $T_L$ lower than 1180° C.; and (4) a strain point $T_{st}$ at 710° C. or higher.

8. The method for preparing the glass with a low inclusion content according to claim 1, wherein the glass composition comprises 56-63 wt % $SiO_2$, 17-22 wt % $Al_2O_3$, 0-5.2 wt % $B_2O_3+P_2O_5$, 1-5 wt % MgO, 2-8 wt % CaO, 0-8 wt % SrO, 1-12 wt % BaO, 0.3-4 wt % ZnO, 0.2-3 wt % $TiO_2$, 0.1-4 wt % $Y_2O_3+La_2O_3+Nd_2O_3$ and <0.05 wt % $R_2O$, wherein $R_2O$ is a sum of the content of $Li_2O$, $Na_2O$ and $K_2O$.

9. The method for preparing the glass with a low inclusion content according to claim 1, wherein the glass composition comprises 0-5 wt % $B_2O_3$, 0-7 wt % $P_2O_5$, 0-2 wt % $Y_2O_3$, 0-3 wt % $La_2O_3$, 0-3 wt % $Nd_2O_3$, 0.01 wt % or less of $Li_2O$, 0.01 wt % or less of $Na_2O$ and 0.01 wt % or less of $K_2O$.

10. The method for preparing the glass with a low inclusion content according to claim 9, wherein the glass composition further comprises a chemical clarifying agent; wherein based on a total weight of the composition, the content of the clarifying agent is not more than 1 wt %.

11. Glass with a low inclusion content prepared by the preparation method according to claim 1.

12. The glass with a low inclusion content according to claim 11, wherein the glass with a low inclusion content: has a density lower than 2.7 g/cm$^3$, a thermal expansion coefficient in a range of 50-350° C. lower than 40×10-7/° C., a Young's modulus higher than 80 GPa, a transmittance at a wavelength of 308 nm of 50% or higher, and a thermal shrinkage at 600° C./10 min lower than 15 ppm.

* * * * *